No. 877,026. PATENTED JAN. 21, 1908.
E. WEINTRAUB.
TRANSFORMING THE ENERGY OF ELECTRIC CURRENTS.
APPLICATION FILED JULY 23, 1903. RENEWED JULY 13, 1907.
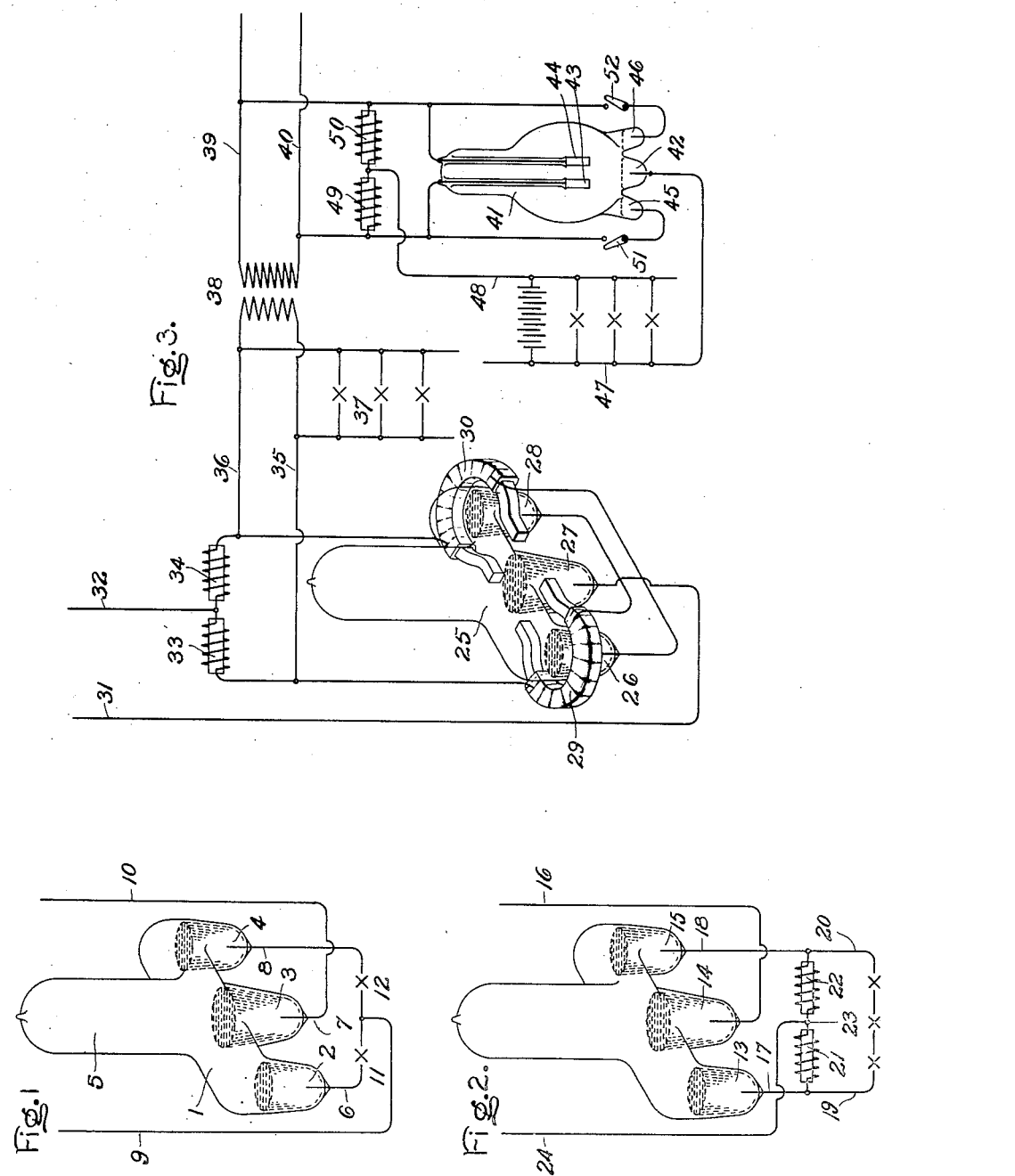
Witnesses:
George A. Thornton
Helen Oxford
Inventor:
Ezechiel Weintraub,
by Albert G. Davis
Atty.

UNITED STATES PATENT OFFICE.

EZECHIEL WEINTRAUB, OF SCHENECTADY, NEW YORK, ASSIGNOR TO GENERAL ELECTRIC COMPANY, A CORPORATION OF NEW YORK.

TRANSFORMING THE ENERGY OF ELECTRIC CURRENTS.

No. 877,026.  Specification of Letters Patent.  Patented Jan. 21, 1908.

Application filed July 23, 1903. Serial No. 166,658. Renewed July 13, 1907. Serial No. 383,621.

*To all whom it may concern:*

Be it known that I, EZECHIEL WEINTRAUB, a subject of the Czar of Russia, residing at Schenectady, county of Schenectady, State of New York, have invented certain new and useful Improvements in Transforming the Energy of Electric Currents, of which the following is a specification.

My invention relates to the transformation of electric currents and more especially to the transformation of direct current into pulsating or alternating current.

In carrying my invention into practice I make use of a vapor electric conductor which, in one of its many forms, may consist of an exhausted receptacle provided with electrodes, one or more of which are of vaporizable material. Such a vapor conductor I utilize in a novel manner to produce the current transformation mentioned. Instead of stopping with the transformation of direct current into alternating current, I may continue the transformation by converting the alternating current into another alternating current of different voltage and then, by the use of a vapor rectifier, converting the alternating current back into direct current. Thus by the series of operations mentioned, I may accomplish the transformation of direct current of one voltage into direct current of a different voltage.

The novel features which characterize my invention I have pointed out with particularity in the appended claims. The invention itself, however, will be best understood by reference to the following description taken in connection with the accompanying drawings in which Figure 1 represents the simplest form of my invention; Fig. 2 a modification; and Fig. 3 a distribution system embodying various additional features of novelty.

The vapor conductor or conductors which I utilize for carrying my invention into operation may assume a number of different forms, one of which is indicated in Fig. 1. In this figure the exhausted envelop or receptacle of the vapor conductor is indicated at 1 and is formed of glass or some other appropriate material such as fused quartz or the like. The receptacle is provided at its bottom portion with three pockets containing bodies of mercury 2, 3 and 4 constituting electrodes. The upper portion of the receptacle is formed into a chamber 5 which serves to condense the mercury vapor produced in the receptacle during operation of the apparatus and thus prevents the accumulation of an excessive amount of vapor in the receptacle, the presence of which would have the effect of increasing the resistance to flow of current in the receptacle.

Electrical connection is made with the electrodes 2, 3 and 4 by leading-in wires 6, 7 and 8 of platinum, nickel steel or the like. The direct current circuit connected to this apparatus, conveys current thereto over the leads or mains 9 and 10. One of these leads, as for example the lead 10, is connected to the middle electrode 3 while the other lead 9 is connected by branch circuits 11 and 12 with the respective electrodes 2 and 4. If now the receptacle 1 be tipped or shaken so as to cause mercury to flow between and temporarily join two of the adjacent bodies of mercury, then a current will follow which, when the mercury separates, will cause an arc to spring. Let it be supposed that an arc is thus formed between the electrode 2 and the middle electrode 3. If the direction of current supply be such that the middle electrode 3 is negative, or in other words a cathode, it will be found that after the arc has persisted for a short time it suddenly deserts the electrode 2 and, while still maintaining its connection with the cathode 3, jumps over to the electrode 4. The new arc thus formed flows only momentarily to the electrode 4 and returns again to the electrode 2. The arc thus oscillates back and forth between the anodes or electrodes 2 and 4 and the cathode 3 with a frequency depending upon a variety of factors such as the exposed areas of the mercury electrodes, the configuration of the receptacle and so forth. The number of pulsations or oscillations by this arrangement may vary from three to ten per second. As the current oscillates back and forth between the anodes 2 and 4 it will be evident that corresponding pulsations of current are produced in the circuits 11 and 12. In these circuits therefore, in the places indicated by the crosses, may be connected any devices to which it is desired to supply pulsating current.

In order to produce from the apparatus alternating current as distinguished from pulsating current, I may utilize the arrangement shown in Fig. 2. The vapor conductor shown in this figure may be identical in construction with that shown in Fig. 1 so that no special description thereof is necessary except to designate the electrodes by the numerals 13, 14 and 15. The middle electrode 14, corresponding to the electrode 3 in Fig. 1, is a cathode and to this end is connected to the negative lead 16 extending from a direct current source of supply. The two remaining electrodes 13 and 15, which operate as anodes, are connected, through suitable leading-in conductors 17 and 18 to mains 19 and 20, from which alternating current is derived in a manner about to be described. Across these mains two inductance coils 21 and 22 are connected in series with each other with the junction 23 between them connected to the remaining direct current supply main 24.

To start the apparatus let it be supposed that the electrodes 13 and 14 are brought into engagement with each other and there separated. This may be done by tipping the receptacle so as to allow mercury to flow between the electrodes 13 and 14 and then, after effecting a momentary electrical connection, to separate. An arc is thus formed by current from the direct current source supplied over the mains 24 and 16. The path of the current may be traced from the main 24 to the junction 23 between the inductance coils 21 and 22, whence, dividing, part passes through the inductance coil 22, and through the circuit 20, 19 to the electrode 13, and the other part through the inductance coil 21 to the same electrode. The combined current then passes through the arc, to the cathode 14 and to the other direct current main 16. As soon as the arc is started, its resistance, which is least at starting, increases until it preponderates to a greater or less degree over that which would be possessed by a freshly started arc between the cathode 14 and the other anode 15. The arc then shifts from the anode 13 to the anode 15, thus substituting a lower resistance path for the higher resistance path, but all the time maintains its connection with the cathode 14 from which it springs. As this shifting takes place, the current from the main 24, dividing, and flowing as before through the inductance coils 21 and 22 in opposite directions from the junction between them, passes to the anode 15. Part of the current flows through the inductance coil 22 directly to this anode, while the other part, flowing through the inductance coil 21, passes through the circuit 19, 20, but in a direction the opposite of that taken by the previous wave of current to the first anode 13. The arc between the cathode 14 and the anode 15 is no sooner established than it shifts back to the first anode 13. The oscillation of the arc between the anodes, which goes on continuously, thus causes an alternating current to flow in the circuit 19, 20. The inductance coils 21 and 22 traversed alternately by the waves in this circuit have the effect of preventing the waves from rising and falling in value abruptly, and thus causes a greater degree of approximation to the sine form. In performing this function the inductance coils store energy as the current rises in value in their windings and restore it as the current falls. As the arc leaves one anode a restoration of energy takes place and in turn is followed by a storing of energy as the arc reaches the other anode. It seems probable therefore that the opposition to current variation due to the inductance coils may be such as to cause the arcs between the cathode 14 and the anodes 13 and 15, instead of being intermittent, to present a condition in which the currents of the arcs are wavy instead of interrupted from movement to movement.

The shifting of the arcs, or of the value of the currents in the arcs, back and forth between one anode and the other is, according to my present understanding of the action, due partly to the fact, as before mentioned, that when a vapor arc starts, its path is of lower resistance than is the case after the arc has been running. Thus it happens that as soon as the arc is started from one anode, as for example the anode 2 in Fig. 1, its resistance so increases as to become greater than the resistance of the path between the cathode 3 and the other anode 4. The arc then immediately shifts over to the anode 4 whereupon the same phenomenon is repeated and the arc shifts back to the anode 2, and so on. During this operation the arcs seem to spring from a bright spot on the surface of the cathode which spot I have for convenience termed the cathode spot. I have found that the rate at which the arc shifts or oscillates between the anodes may be greatly increased by driving the cathode spot, or the arc which emanates from the spot, by electromagnetic means, back and forth so that it is first nearer to one anode than to the other, then nearer to the latter than to the first, and so on. By this means the frequency of the alternating current which may be derived from the apparatus is very greatly raised. In Fig. 3 I have represented an apparatus for accomplishing this result, which figure also represents various additional features of novelty. The vapor conductor is indicated at 25 and is or may be of substantially the same form as that shown in Fig. 1 and, like the vapor conductor in Fig. 1, is provided with three mercury electrodes 26, 27 and 28. A direct current supply circuit and alternating current consumption or receiving circuit are connected to the vapor conductor in much the same manner as represented by the scheme of connections in Fig. 2 except, however, for the interpolation of two electromagnets 29 and 30 located respectively so that the magnetic field produced by each extends across one of the spaces between the middle electrode or cathode 27 and the coöperating electrodes or anodes 26, 28.

The direct current supply mains are represented at 31 and 32. One of these mains, in this case the main 31, is connected to the cathode 27. The other main 32 is connected to the junction between the two inductance coils 33 and 34 which in turn are respectively connected to the windings of the electromagnets 29 and 30. The remaining terminal of the electromagnet 29, located at one side of the cathode 27, is connected to the anode 28 located on the other side of the cathode 27. In a similar manner the remaining terminal of the electromagnet 30, located at one side of the cathode 27, is connected to the anode 26 on the opposite side of said cathode.

The alternating current mains 35 and 36 extend respectively from the leads which are connected to the outside terminals of the two inductance coils 33 and 34 as indicated. This alternating current circuit may supply alternating current translating devices of any desired character as represented for example by the consumption circuit 37. The alternating current may be utilized in this circuit directly without further transformation, although if desired the alternating current may be changed to any other desired voltage by means of step-up or step-down transformers.

By stepping-up or stepping-down the voltage of the alternating current derived, by the operation of the vapor conductor, from the direct current circuit, and then reconverting the alternating current of the new voltage, by means of a vapor rectifier or rectifiers, into a direct current, I am enabled to accomplish the conversion of direct current of one voltage into direct current of another voltage without the use of apparatus with moving parts. As an illustration of this operation a transformer 38 of any desired ratio of transformation, in this case a step-up transformer, is connected with its primary to the alternating current mains 35 and 36, and with its secondary to a pair of leads 39 and 40 extending to a vapor rectifier 41 of a form heretofore invented by me and disclosed in detail in various pending applications, as for example in Serial No. 149,084 filed March 23rd, 1903. The rectifier 41 includes an exhausted receptacle of the form indicated provided with main electrodes 42, 43 and 44 and starting electrodes 45, 46. The main electrodes 43 and 44 together with the starting electrodes 45 and 46 are connected to the supply mains 39 and 40 while the remaining electrode 42 is connected to one main 47 of a direct current consumption circuit, which in the present instance is represented as supplying translating devices of a variety of forms. The other main or lead 48 of the consumption circuit is connected to the junction between two reactance coils 49 and 50, which are in series across the mains 39 and 40. After the rectifier is started by tipping or shaking it so as to bring the starting electrodes into momentary contact with the main electrode 42, the resulting arcs are transferred to the main electrodes 43 and 44 by opening the switches 51 and 52, the arcs then playing between these electrodes and the common cathode 42. The alternating current from the transformer 38 is thus rectified and then utilized in the consumption circuit 47, 48.

In the foregoing description I have set forth in some detail certain organizations for converting direct current into pulsating or alternating current, and further for reconverting the alternating current thus produced into direct current either of the same or of a different voltage. It will be evident, however, to one skilled in the art, that various modifications of my invention are possible without departing from the spirit thereof. Thus for example, a multiphase alternating current may be produced instead of the single-phase current. Also, the magnets 29 and 30, instead of being excited as shown, may be excited from a separate alternating current source which thus acts as a frequency setter. I, therefore, do not wish my invention to be limited to the exact details shown and described.

Moreover, although in the foregoing specification I have set forth that theory of operation of my invention, which at the present time seems to me to best explain the operations taking place, I do not hold myself responsible for the correctness of this theory, since it will be evident that the beneficial effects of my invention may be obtained without recourse to any theory of operation.

What I claim as new and desire to secure by Letters Patent of the United States, is,

1. The combination of a source of direct current, a vapor conductor for converting the direct current into alternating current, means for transforming the alternating current into another alternating current of different voltage, and means for reconverting the last-named alternating current into direct current.

2. The combination of a source of direct current, a vapor conductor for converting the direct current into alternating current, means for transforming the alternating current into another alternating current of different voltage, and a vapor rectifier for reconverting the last-named alternating current into direct current.

3. The combination of a vapor conductor having three electrodes, a direct current circuit having one of its mains or leads connected to one of said electrodes and its other main or lead to the other two electrodes.

4. The combination of a vapor conductor, a plurality of electrodes one of which is a cathode, and magnetic means for shifting the cathode spot.

5. The combination of a vapor conductor, a plurality of electrodes one of which is a cathode, and electromagnetic means for shifting the cathode spot.

6. The combination of a source of direct current, a vapor conductor for converting the direct current into alternating current, and a vapor rectifier for converting the alternating current into direct current.

7. In a vapor conductor, means for generating an arc in which the current periodically varies, and means for increasing the frequency of the periodic variations.

8. The combination of an exhausted envelop provided with electrodes one at least of which is adapted to emit vapor, a source of direct current, and connections between said source and said electrodes such that when an arc is started in said envelop, it varies periodically in current value.

9. The combination of a plurality of anodes, a common cathode, a source of direct current connected so as to produce an arc springing from said cathode and shifting from anode to anode, and means for accelerating the shifting of the arc.

10. The combination of a plurality of anodes arranged with respect to a common cathode so that an arc springing from the cathode shifts in succession from anode to anode, and means for accelerating the shifting of said arc.

11. The combination of a direct current supply circuit, a consumption circuit, and a vapor electric device for converting direct current from said supply circuit into alternating current and supplying it to said consumption circuit.

12. The combination of a direct current supply circuit, a consumption circuit, a vapor electric device having a cathode and a plurality of anodes, connections from the consumption circuit to the anodes, and connections from the direct current circuit to said cathode and said consumption circuit.

13. In combination, a source of direct current, a consumption circuit, a vapor electric apparatus having alternative paths for current, and connections for such apparatus whereby direct current from said source is changed into pulsating or alternating current and fed to said consumption circuit.

14. The combination of a plurality of anodes, a common cathode, a source of direct current having one terminal connected to the cathode, and connections for the other terminal affording alternative paths between said cathode and said anodes whereby the arc from the cathode shafts from anode to anode.

15. The combination of a plurality of anodes, a cathode forming the seat of arcs to said anodes, and a source of direct current connected to said anodes and cathode so as to permit a shifting of the arc from one anode to another.

16. The combination of a plurality of anodes, a cathode forming the seat of arcs to said anodes, and a source of direct current connected to said anodes and cathode so as to permit a shifting of the arc in succession from one anode to another.

17. The combination of a source of direct current, and a vapor electric device for converting direct current from said source into alternating current.

In witness whereof, I have hereunto set my hand this 18th day of July, 1903.

EZECHIEL WEINTRAUB.

Witnesses:
BENJAMIN B. HULL,
MARGARET E. WOOLLEY.